United States Patent [19]

Ebner

[11] 4,425,260

[45] Jan. 10, 1984

[54] CATALYSTS FOR THE OXIDATION AND AMMOXIDATION OF ALCOHOLS

[75] Inventor: Jerry R. Ebner, St. Charles, Mo.

[73] Assignee: Monsanto Company, St. Louis, Mo.

[21] Appl. No.: 430,589

[22] Filed: Sep. 30, 1982

[51] Int. Cl.$^3$ .............................................. B01J 23/88
[52] U.S. Cl. ................................ 502/255; 260/465 C; 260/465.1; 260/465.3; 502/516
[58] Field of Search ..................... 252/458; 260/465.3, 260/465.1, 465 R, 465 C

[56] References Cited

U.S. PATENT DOCUMENTS 3,846,341 11/1974 Courty ................................ 252/458
3,855,153 12/1974 Chang ................................ 252/458
4,181,629 1/1980 Cairati et al. ...................... 252/458

FOREIGN PATENT DOCUMENTS 51-10200 1/1976 Japan .
51-99700 9/1976 Japan .
53-149900 12/1978 Japan .
54-126698 10/1979 Japan .

Primary Examiner—Delbert E. Gantz
Assistant Examiner—Anthony McFarlane
Attorney, Agent, or Firm—Thomas Y. Awalt, Jr.; Wendell W. Brooks

[57] ABSTRACT

Catalysts useful for the oxidation and ammoxidation of alcohols containing the elements iron and molybdenum in a catalytically active oxidized state exhibit improved selectivity and yield upon being activated by contacting calcined catalyst particles sequentially with a molecular oxygen-free reducing gas and an oxygen-containing gas at catalyst activating conditions. These activated catalysts are especially useful for the production of hydrogen cyanide from methanol, ammonia, and an oxygen-containing gas.

17 Claims, No Drawings

CATALYSTS FOR THE OXIDATION AND AMMOXIDATION OF ALCOHOLS

BACKGROUND OF THE INVENTION

1. Field of the Invention

This invention relates to oxidation and/or ammoxidation catalysts containing the elements iron and molybdenum in a catalytically active oxidized state and to a process for preparing such catalysts, which catalysts exhibit an improvement in selectivity and yield. In another aspect, this invention relates to a process for employing such catalysts to effect the oxidation and/or ammoxidation of alcohols. In a more specific aspect, this invention relates to a process for employing such catalysts for the ammoxidation of methanol to hydrogen cyanide.

It is known that methanol can be oxidized to the corresponding carbonyl compounds, formaldehyde and formic acid. It is also known that methanol can be ammoxidized to hydrogen cyanide (methanenitrile). The value of such carbonyl compounds and hydrogen cyanide is generally well recognized, with hydrogen cyanide being one of the most valuable compounds available to the chemical industry. Its chief commercial use is as a basic chemical building block for such chemical products as sodium cyanide, potassium cyanide, methyl methacrylate, methionine, triazines, iron cyanides, adiponitrile, and chelates, and other organic compounds, especially acrylonitrile, acetone cyanohydrin, and vinylidene cyanide, the latter compounds being intermediates in the manufacture of certain types of synthetic rubbers, plastics, and fibers.

Hydrogen cyanide is produced primarily by the ammoxidation of methane over platinum metals as catalysts. It has also been produced in substantial quantities as a by-product in the ammoxidation of propylene to acrylonitrile. Recent improvements in the catalysts for the acrylonitrile production, however, have resulted in a significant reduction in the quantity of hydrogen cyanide by-product, while, at the same time, demand has increased. As a result, it is highly desirable to provide more efficient catalysts for the production of hydrogen cyanide from readily available raw materials.

Other nitriles of value which may be produced using the catalysts and process of this invention include acetonitrile from ethanol, acrylonitrile from allyl alcohol, and benzonitrile from benzyl alcohol.

2. Description of the Prior Art

Various catalytic processes are known for the oxidation and/or ammoxidation of methanol. Such processes commonly react methanol or a methanol-ammonia mixture with oxygen in the vapor phase in the presence of a catalyst.

Many catalysts are disclosed as suitable in the oxidation and ammoxidation of methanol. In Japanese Kokai patent Sho No. 51[1976]-10200, a metal oxide catalyst consisting of antimony and at least one additional element from iron, cobalt, nickel, manganese, zinc, and uranium, with the atomic ratio of antimony and the additional elements varying from 1/10 to 10/1, preferably ½ to 6/1, is disclosed. The catalyst can be used with or without a support, with silica being a preferred support. A catalyst containing tellurium oxide and molybdenum oxide and optionally at least one of the oxides of tungsten, vanadium, chromium, manganese, iron, cobalt, nickel, zinc, tin, bismuth, and antimony is disclosed as suitable for use in a methanol ammoxidation process to produce hydrogen cyanide in Japanese Kokai patent Sho No. 51[1976]-99700. In Japanese Kokai patent Sho No. 53[1978]-149900, a catalyst prepared by spray-drying and calcining a homogeneously mixed solution of silica sol, iron, and molybdenum compounds is disclosed for use in a methanol ammoxidation process. Japanese Kokai patent Sho No. 54[1979]-126698 discloses a catalyst supported on 30-70 wt. % silica represented by the empirical formula:

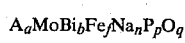

$$A_a MoBi_b Fe_f Na_n P_p O_q$$

wherein A is at least one element chosen from among potassium, rubidium, cesium, molybdenum, bismuth, iron, sodium, phosphorus, and oxygen, a, b, f, n, p, and q represent the number of atoms of, respectively, A, bismuth, iron, sodium, phosphorus, and oxygen per one (1) atom of molybdenum, with a being a number within the range of 0-0.05, and b, f, and n are numbers that are determined with the respective formulaes of $$b = \frac{(1-X)(1-Y)(1-Z)}{Y} + 0.5 Z + p$$

$$f = \frac{X(1-Y)(1-Z)}{Y}$$

$$n = 0.5 Z$$

In these formulae, X and Y are numbers inside a square wherein the four coordinate points of (0.35, 0.40), (0.35, 0.65), (0.80, 0.40), and (0.80, 0.65) can be connected, Z is a number within the range of 0-0.6, p is a number within the range of 0-0.2, and q is a number taken to satisfy the valences of the elements in the catalyst.

Although the yield and selectivity of the above-described catalysts are generally satisfactory, the commercial utility of a catalyst system is highly dependent upon the cost of the system, the conversion of the reactant(s), the yield of the desired product(s), and the stability of the catalyst during operation. In many cases, a reduction in the cost of a catalyst system on the order of a few cents per pound or a small percent increase in the yield of the desired product represents a tremendous commercial economical advantage. And since it is well known that the economics of manufacturing processes dictate increasingly higher yields and selectivities in the conversion of reactants to products in order to minimize the difficulties attending the purification of the product(s) and handling of large recycle streams, research efforts are continually being made to define new or improved catalyst systems and methods and processes of making new and old catalyst systems to reduce the cost and/or upgrade the activity and selectivity of such catalyst systems. The discovery of the improved catalysts of the present invention is therefore believed to be a decided advance in the state of the art.

SUMMARY OF THE INVENTION

It is an object of this invention to provide stabilized catalysts containing the elements iron and molybdenum in a catalytically active oxidized state useful in the preparation of nitriles by ammoxidation of alcohols, characterized by high activity and selectivity of the nitriles.

Another object of this invention is to provide catalysts which are useful for the oxidation of alcohols to the corresponding carbonyl compounds.

Still another object of this invention is to provide catalysts which are useful for the ammoxidation of methanol to hydrogen cyanide.

Yet another object of this invention is to provide catalysts which are useful for the oxidation of methanol to formaldehyde and/or formic acid.

A further object of this invention is to provide an improved process for the preparation of catalysts containing oxygen, iron, and molybdenum.

Yet another object of this invention is to provide an ammoxidation process which employs such catalysts.

To achieve these and other objects which will become apparent from the accompanying description and claims, a catalyst is provided which contains the elements iron and molybdenum in a catalytically active oxidized state represented by the empirical formula:

$Fe_aMo_bO_c$ wherein a is 1, b is 1 to 5, and c is a number taken to satisfy the valence requirements of Fe and Mo in the oxidation states in which they exist in the catalysts. According to the present invention, such catalysts are prepared by (a) mixing an aqueous solution of ammonium molybdate with an aqueous solution of ferric nitrate in amounts sufficient to cause formation of an iron/molybdenum oxide precipitate;

(b) heating the aqueous iron/molybdenum oxide mixture at a temperature and for a time sufficient to convert the initially formed brown precipitate to a tan-to-yellow precipitate;

(c) forming the aqueous iron/molybdenum oxide mixture into dry particles;

(d) calcining the dry particles; and (e) contacting the calcined particles sequentially with a molecular oxygen-free reducing gas and an oxygen-containing gas at activating conditions for a time sufficient to activate the calcined particles.

DESCRIPTION OF THE PREFERRED EMBODIMENTS

In accordance with this invention, catalysts containing iron and molybdenum in a catalytically active oxidized state useful for the oxidation and/or ammoxidation of alcohols are represented by the empirical formula:

$Fe_aMo_bO_c$ wherein a is 1, b is 1 to 5, and c is a number taken to satisfy the valence requirements of Fe and Mo in the oxidation states in which they exist in the catalysts. According to the present invention, such catalysts are prepared by (a) mixing an aqueous solution of ammonium molybdate with an aqueous solution of ferric nitrate in amounts sufficient to cause formation of an iron/molybdenum oxide precipitate;

(b) heating the aqueous iron/molybdenum oxide mixture at a temperature and for a time sufficient to convert the initially formed brown precipitate to a tan-to-yellow precipitate;

(c) forming the aqueous iron/molybdenum oxide mixture into dry particles;

(d) contacting the calcined particles sequentially with a molecular oxygen-free reducing gas and an oxygen-containing gas at activating conditions for a time sufficient to activate the calcined particles.

The catalysts of the present invention are prepared under narrowly prescribed critical conditions. An aqueous iron/molybdenum oxide slurry is prepared by combining sufficient amounts of aqueous solutions of ammonium molybdate and ferric nitrate. Since the ammonium molybdate solution is essentially neutral with respect to pH and the ferric nitrate solution is highly acidic, the resulting aqueous iron/molybdenum oxide slurry or mixture will also be highly acidic, that is to say, it will have a pH less than about 3.

The term "ammonium molybdate" is employed herein to include normal ammonium molybdate $[(NH_4)_2MoO_4$—prepared by dissolving molybdenum trioxide in aqueous ammonia], as well as ammonium paramolybdate $[(NH_4)_6Mo_7O_{24}.4H_2O$; commercially available].

Upon mixing the two aqueous solutions, an initial brown precipitate forms. It has been found to be critical to the performance of the catalysts that this initially formed brown precipitate is converted to a final tan-to-yellow precipitate. This conversion is readily accomplished by heating the mixture at a temperature (usually 95°–100° C.) and for a time sufficient to effect such conversion (usually 1–2 hours).

If a supported catalyst is desired, an aqueous mixture of a suitable support material is slurried into the aqueous iron/molybdenum oxide mixture. The resultant slurry may be ball milled, if desired, for about 16–18 hours or until the solid particles are reduced to a size less than about 10 microns in diameter.

At this point, the iron/molybdenum oxide mixture (including support material, if employed) is heated to remove the bulk of the aqueous phase. The concentrated mixture or slurry contains a certain amount of water and it is desirable to remove this water by some form of drying process to form a dry catalyst precursor. This can take the form of a simple oven drying process in which the water-containing solid phase is subjected to a temperature that is sufficiently high to vaporize the water and completely dry the solid phase.

An alternate drying process which may be employed is the so-called spray-drying process. In this process, which is preferred for use in the present invention, water-containing solid phase particles are sprayed into contact with a hot gas (usually air) so as to vaporize the water. The drying is controlled by the temperature of the gas and the distance the particles travel in contact with the gas. It is generally desirable to adjust these parameters to avoid too rapid drying as this results in a tendency to form dried skins on the partially dried particles of the solid phase which are subsequently ruptured as water occluded within the particles vaporizes and attempts to escape. At the same time, it is desirable to provide the catalyst in a form having as little occluded water as possible. Therefore, where a fluidized bed reactor is to be used and microspheroidal particles are desired, it is advisable to choose conditions of spray drying with a view toward achieving substantially complete drying without particle rupture.

Following the drying operation, the catalyst precursor is calcined. The calcination is usually conducted in air at essentially atmospheric pressure and at a temperature in the range from about 500° C. to about 1150° C., preferably from about 750° C. to about 900° C. The time to complete the calcination can vary and will depend upon the temperature employed. In general, the time period can be anything up to about 24 hours, but for most purposes, a time period from about 1 hour to about 3 hours at the designated temperatures is sufficient.

The catalyst which results from the calcination can be employed as is to effect the oxidation and/or ammoxidation of alcohols. However, the advantages of superior selectivity and yield demonstrated by the catalysts of the present invention are realized only upon activation or conditioning of the calcined catalyst by contacting the catalyst initially with a molecular oxygen-free reducing gas, followed by an oxygen-containing gas, air, for example, at catalyst activating conditions for a time sufficient to activate or condition the calcined catalyst.

The molecular oxygen-free reducing gas suitable for use in the present invention include vaporous alcohols capable of undergoing the oxidation and ammoxidation reactions of the present invention (as hereinafter defined—methanol, for example), ammonia, carbon monoxide, $C_1$–$C_4$ hydrocarbons (methane, ethane, propane, butane, ethylene, propylene, 1-butene for example, with propylene being a preferred hydrocarbon), and mixtures thereof. Inert diluent gases such as helium, nitrogen, argon, and the like may also be present. A preferred reducing gas is a mixture of methanol and ammonia diluted with helium, particularly in those instances wherein the desired subsequent reaction is the ammoxidation of methanol to hydrogen cyanide. In general, suitable concentrations of the reducing gas are the same as those employed for the subsequent reaction of alcohols.

The conditions at which the catalyst activation is carried out is not narrowly critical. All that is necessary is that the tendency of the unactivated catalyst to cause undesirable burning (oxidation) of ammonia to nitrogen oxides ($NO_x$) and alcohols to carbon oxides (carbon monoxide, CO, and carbon dioxide, $CO_2$) is passivated during the activation. Thus, the catalyst activation can be conducted at temperatures in the range from about 350° C. to about 550° C. and at pressures in the range from about 100 kPa to about 600 kPa (14.7 psia to about 88.2 psia). Preferred temperatures and pressures, however, range from about 400° C. to about 500° C. and 125 kPa to about 200 kPa (18.2 psia to about 29 psia), respectively. In general, and for convenience, the catalyst activation can be performed at the temperature and pressure to be employed in the subsequent oxidation and/or ammoxidation of alcohols.

The time required for the desired catalyst activation is not critical and will vary depending upon the amount of catalyst, the flow rate and the concentration of the reducing gas and oxygen-containing gas, the temperature and pressure existing in the reactor, and the like employed. In general, a contact time from about 5 minutes to about 15 minutes for each of the molecular oxygen-free reducing gas and the oxygen-containing gas is sufficient.

The catalyst can be employed without a support and will display excellent activity. However, in some applications, it may be advantageous to include in the catalyst a support material which functions by providing a large surface area for the catalyst and by creating a harder and more durable catalyst for use in the highly abrasive environment of a fluidized bed reactor. This support material can be any of those commonly proposed for such use, such as, for example, silica, zirconia, alumina, titania, antimony pentoxide sol, or other oxide substrates. From the point of view of availability, cost, and performance, silica is usually a satisfactory support material and is preferably in the form of silica sol for easy dispersion.

The proportions in which the components of the supported catalyst are present can vary widely, but it is usually preferred that the support material provides from about 10% to about 90% and more preferably about 35% to about 65% by weight of the total combined weight of the catalyst and the support. To incorporate a support into the catalyst, the support material (if not already mixed with water as, for example, silica sol) is first mixed with water. The aqueous support material mixture is then slurried with the aqueous iron/molybdenum oxide mixture at a rate sufficient to maintain slurry fluidity and prevent gel formation.

As previously stated, catalysts according to this invention are those represented by the empirical formula:

$$Fe_aMo_bO_c$$

wherein a is 1, b is 1 to 5, and c is a number taken to satisfy the valence requirements of the Fe and Mo in the oxidation states in which they exist in the catalyst. In more preferred embodiments of such catalysts, a is 1 and b is 1.5.

The catalyst preparation of this invention yields improved catalysts that exhibit exceptional utility in the production of nitriles from alcohols. Alcohols suitable for use in this invention are those characterized as primary alcohols. Primary alcohols are defined as those alcohols which contain the carbinol groups, —$CH_2OH$, that is, those having at least two (2) hydrogen atoms attached to the hydroxy-substituted carbon. Nonlimiting representatives of such alcohols include methanol, ethanol, 1-propanol, 1-butanol, 2-methyl-1-propanol (isobutyl alcohol), 2-propen-1-ol (allyl alcohol), benzyl alcohol, and the like. Of particular importance is the production of hydrogen cyanide (methanenitrile) from methanol and in the discussion which follows, specific reference is made to that process although it should be understood that the described catalysts are also useful for the ammoxidation of other suitable alcohols and for the oxidation of such alcohols to the corresponding carbonyl compounds(s), for example, aldehydes and carboxylic acids.

In the most frequently used ammoxidation processes, a mixture of alcohol, ammonia, and oxygen (or air) is fed into a reactor and through a bed of catalyst particles at elevated temperatures. Such teperatures are usually in the range of about 350° C. to about 550° C. and preferably about 400° C. to about 500° C., and the pressure is from about 1 atmosphere to about 6 atmospheres (14.7 psia to about 88.2 psia; 100 kPa to about 600 kPa), preferably about 18.2 psia to about 29 psia (125 kPa to about 200 kPa). The ammonia and alcohol are required stoichiometrically in equimolar amounts, but it may be advantageous in many instances to operate with a mol ratio of ammonia to alcohol in excess of 1 to reduce the incidence of side reactions. Likewise, oxygen and alcohol are required in stoichiometrically equimolar amounts, but a mol ratio of oxygen to alcohol in excess of 1 is usually employed. The feed mixture is commonly introduced into the catalyst bed at W/F (defined as the weight of the catalyst in grams divided by the flow rate of reactant stream in ml/sec at standard temperature and pressure) in the range of about 2 g-sec/ml to about 15 g-sec/ml, preferably from about 4 g-sec/ml to about 10 g-sec/ml.

The ammoxidation reaction is exothermic and for convenience in heat distribution and removal, the catalyst bed is desirably fluidized. However, fixed catalyst beds may also be employed with alternative heat removal means such as cooling coils within the bed.

The catalysts as prepared by the improved process of this invention are particularly well adapted for use in such a process in that improved yields of and selectivities to the desired product(s) are experienced due to the unique and novel preparative procedure employed herein.

The following examples illustrating the best presently known methods of practicing this invention are described in order to facilitate a clear understanding of the invention. It should be understood, however, that the expositions of the application of the invention, while indicating preferred embodiments, are given by way of illustration only and are not to be construed as limiting the invention since various changes and modifications within the spirit of the invention will become apparent to those skilled in the art from this description.

As used herein, the following terms are defined in the following manner:

1. "W/F" is defined as the weight of the catalyst in grams divided by the flow rate of the reactant stream in ml/sec measured at STP, the units being g-sec/ml.

2. "Methanol ($CH_3OH$) conversion", is defined as:

$$\frac{\text{mols } CH_3OH \text{ in feed} - \text{mols } CH_3OH \text{ in effluent}}{\text{mols } CH_3OH \text{ in feed}} \times 100$$

3. "HCN selectivity" is defined as:

$$\frac{\text{mols HCN in effluent}}{\text{mols } CH_3OH \text{ converted}} \times 100$$

4. "HCN yield" is defined as:

$$\frac{\text{mols HCN formed}}{\text{mols } CH_3OH \text{ in feed}} \times 100$$

In the following paragraphs, the catalysts (approximately 25–30 g in each case), were evaluated in a fluidized bed reaction vessel having an inside diameter of about 14 mm to determine hydrogen cyanide selectivity and yield and methanol conversion. A reactant mixture of 17.5–18.5 volume % $O_2$, 6–8 volume % methanol ($CH_3OH$), 6–9 volume % ammonia ($NH_3$), and the balance helium was passed upward through the catalyst bed at a rate sufficient to give the value of W/F desired. The temperature was maintained between about 400° C. and about 500° C. (preferred temperatures) and the pressure at about 125 kPa (18.2 psia) to about 200 kPa (29 psia) unless otherwise noted.

EXAMPLE 1

(a) Catalyst Synthesis

A catalyst having the following composition:

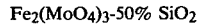

$Fe_2(MoO_4)_3$-50% $SiO_2$ was prepared in the following manner. A solution of 265.0 g (0.21 mol of ammonium paramolybdate [$(NH_4)_6Mo_7O_{24}\cdot 4H_2O$)] dissolved in 120 ml of 28% aqueous ammonia [57% ammonium hydroxide ($NH_4OH$)] and 600 ml of distilled water was added, with vigorous stirring to a solution of 404.0 g (1.00 mol) of ferric nitrate nonahydrate [$Fe(NO_3)_3\cdot 9H_2O$] dissolved in 580 ml of distilled water at a rate sufficient to prevent gel formation. A light brown precipitate formed during the addition. The mixture, having a pH of 2.0–2.3, was heated at about 100° C. until the initially formed light brown precipitate turned bright yellow. The vessel was covered during the heating period to minimize loss of water. To this mixture was added 740.0 g of 40% aqueous silica sol (Nalcoag 2327), its pH having been adjusted to 2.0–2.3 with 70% nitric acid, at a rate sufficient to maintain the fluidity of the slurry. The slurry was refluxed for about 2.5 hours and thereafter concentrated until a viscosity suitable for spray drying was obtained (approximately 1000 ml total volume). The slurry was then spray dried at a temperature of about 150° C. The dried particles were calcined at 760° C. for 2 hours in air.

(b) Catalyst Activation

A 25.0 g charge of the catalyst from (a) above was placed in the reaction vessel described above. A molecular oxygen-free reducing gas containing approximately 8.5 volume % ammonia ($NH_3$), 8.5 volume % methanol, and the balance helium (in the vapor phase) was passed upward through the catalyst bed at 428° C. and 170.25 kPa (24.7 psia), and a flow rate sufficient to give a W/F value of 3.5, for an 8 minute period. Thereafter, passage of the reducing gas was terminated and air was passed upward through the catalyst for a 10 minute period under the same conditions as for the reducing gas.

(c) Catalyst Evaluation

To demonstrate the improvement of the catalysts of the present invention, catalyst samples from (a), unactivated, and (b), activated, were separately charged to fluidizing reaction vessels described above and used to convert methanol to hydrogen cyanide (HCN). The parameters and results are shown in Table 1.

TABLE 1

| Run | 1 | 2 | 3 | 4 | 5 | 6 | 7 |
|---|---|---|---|---|---|---|---|
| Catalyst | 1(a) | 1(a) | 1(b) | 1(b) | 1(b) | 1(b) | 1(b) |
| Reaction Temperature, °C. | 428 | 428 | 428 | 428 | 428 | 440 | 425 |
| Pressure, $10^2$ kPa | 1.70 | 1.70 | 1.70 | 1.70 | 1.70 | 1.70 | 1.70 |
| Feed, Vol. % | | | | | | | |
| $CH_3OH$ | 6.8 | 7.1 | 7.0 | 7.3 | 7.2 | 6.9 | 7.0 |
| $NH_3$ | 7.2 | 7.0 | 6.9 | 7.2 | 7.2 | 7.0 | 7.0 |
| $O_2$ | 18.3 | 18.3 | 18.3 | 18.4 | 18.2 | 18.4 | 18.4 |
| W/F, g-sec/ml | 3.3 | 3.3 | 3.3 | 3.3 | 3.3 | 3.3 | 4.0 |
| $CH_3OH$ Conv., mol % | 97.9 | 97.9 | 98.0 | 97.9 | 98.2 | 99.1 | 98.3 |
| HCN | | | | | | | |
| Selectivity, mol % | 77.4 | 77.9 | 86.2 | 86.4 | 86.3 | 86.5 | 85.5 |
| Yield, mol % | 74.7 | 72.4 | 84.0 | 83.7 | 85.0 | 86.4 | 84.7 |

As can be seen, the catalysts prepared according to the improved procedure of the present invention gave, in each instance, substantially higher hydrogen cyanide selectivity and yield than unactivated catalysts, thereby demonstrating the improvement exhibited by the catalysts of the present invention.

Thus, it is apparent that there has been provided in accordance with the present invention, catalysts and a process for using same that fully satisfy the objects and advantages set forth hereinabove. While the invention has been described with respect to various specific examples and embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A catalyst containing iron and molybdenum in a catalytically active oxidized state useful for the oxidation and ammoxidation of alcohols, which catalyst is represented by the empirical formula: $Fe_aMo_bO_c$ wherein a is 1, b is 1 to 5, and c is a number taken to satisfy the valence requirements of Fe and Mo in the oxidation states in which they exist in the catalyst, the catalyst being prepared by (a) mixing an aqueous solution of ammonium molybdate with an aqueous solution of ferric nitrate in amounts sufficient to cause formation of an iron/molybdenum oxide precipitate;

(b) heating the aqueous iron/molybdenum oxide mixture at a temperature and for a time sufficient to convert the initially formed brown precipitate to a tan-to-yellow precipitate;

(c) forming the aqueous iron/molybdenum oxide mixture into dry particles;

(d) calcining the dry particles; and (e) contacting the calcined particles sequentially with a molecular oxygen-free reducing gas and an oxygen-containing gas at a temperature from about 350° C. to about 550° C. and a pressure from about 100 kPa to about 600 kPa for at least about 5 minutes.

2. The catalyst of claim 1 wherein a is 1 and b is 1.5.

3. The catalyst of claim 1 wherein the aqueous ammonium molybdate solution is prepared by dissolving molybdenum trioxide or ammonium paramolybdate in aqueous ammonia.

4. The catalyst of claim 1 wherein the catalyst contains a support material comprising from about 10% to about 90% by weight of the total weight of the catalyst.

5. The catalyst of claim 4 wherein the support material comprises from about 35% to about 65% by weight of the total weight of the catalyst.

6. The catalyst of claim 4 wherein the support material is silica.

7. The catalyst of claim 4 wherein the support material is incorporated into the catalyst by slurrying an aqueous support material mixture with the aqueous iron/molybdenum oxide mixture.

8. The catalyst of claim 1 wherein the dry particles are formed by spray drying the aqueous slurry.

9. The catalyst of claim 1 wherein the dry particles are calcined at a temperature from about 500° C. to about 1150° C.

10. The catalyst of claim 9 wherein the calcination temperature is from about 750° C. to about 900° C.

11. The catalyst of claim 1 wherein the molecular oxygen-free reducing gas is selected from the group consisting of at least one vaporous alcohol, ammonia, carbon monoxide, a $C_1$–$C_4$ hydrocarbon, and mixtures thereof.

12. The catalyst of claim 11 wherein the molecular oxygen-free reducing gas is an alcohol-ammonia mixture.

13. The catalyst of claim 12 wherein the alcohol in the alcohol-ammonia mixture is methanol.

14. The catalyst of claim 1 wherein the molecular oxygen-free reducing gas contains an inert diluent gas.

15. The catalyst of claim 14 wherein the inert diluent gas is helium.

16. The catalyst of claim 1 wherein the oxygen-containing gas is air.

17. The catalyst of claim 1 wherein the calcined particles are contacted with each of the molecular oxygen-free reducing gas and the oxygen-containing gas for a period of time from about 5 minutes to about 15 minutes.

* * * * *